Figure 1:
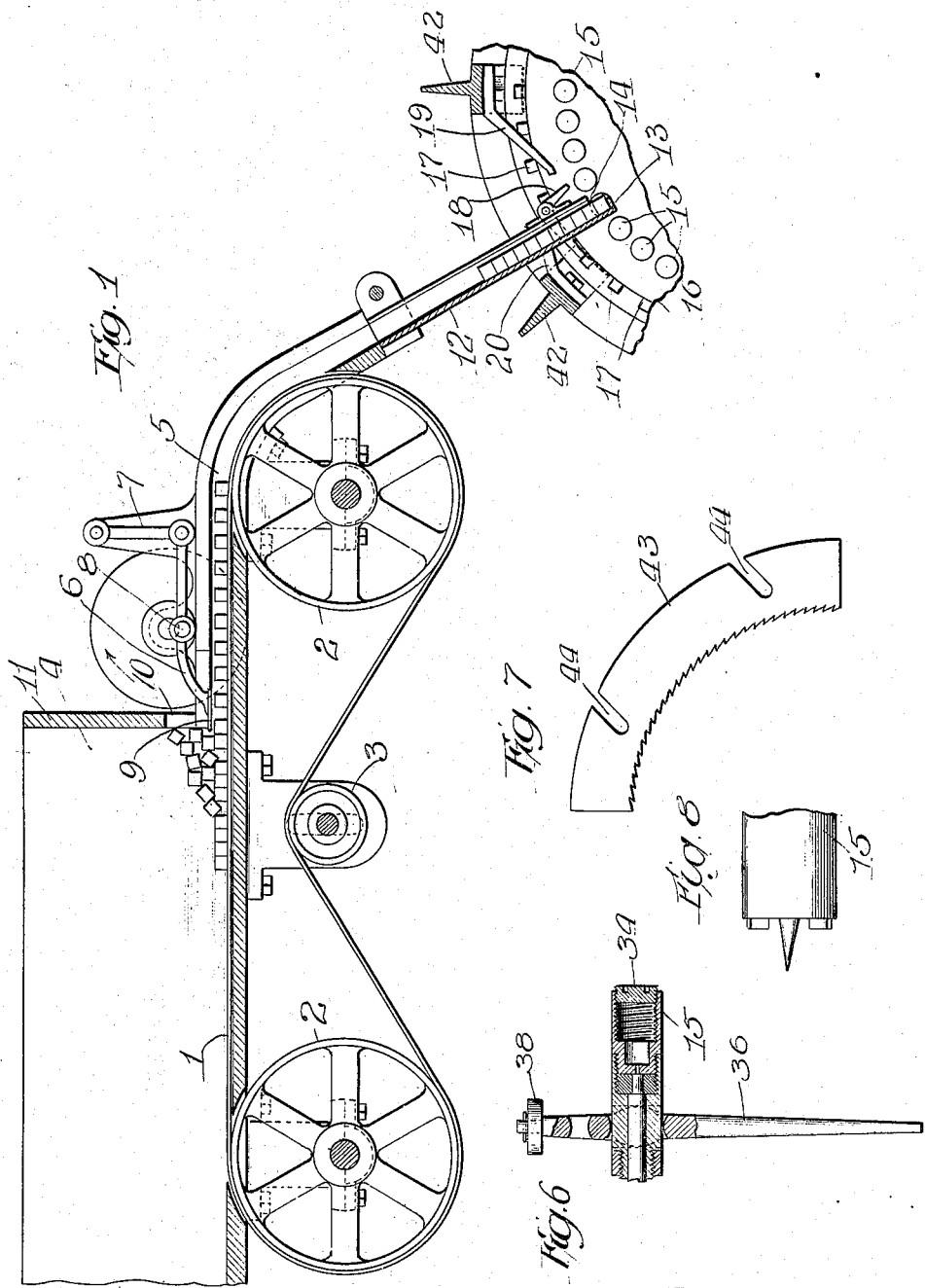
Figure 2:
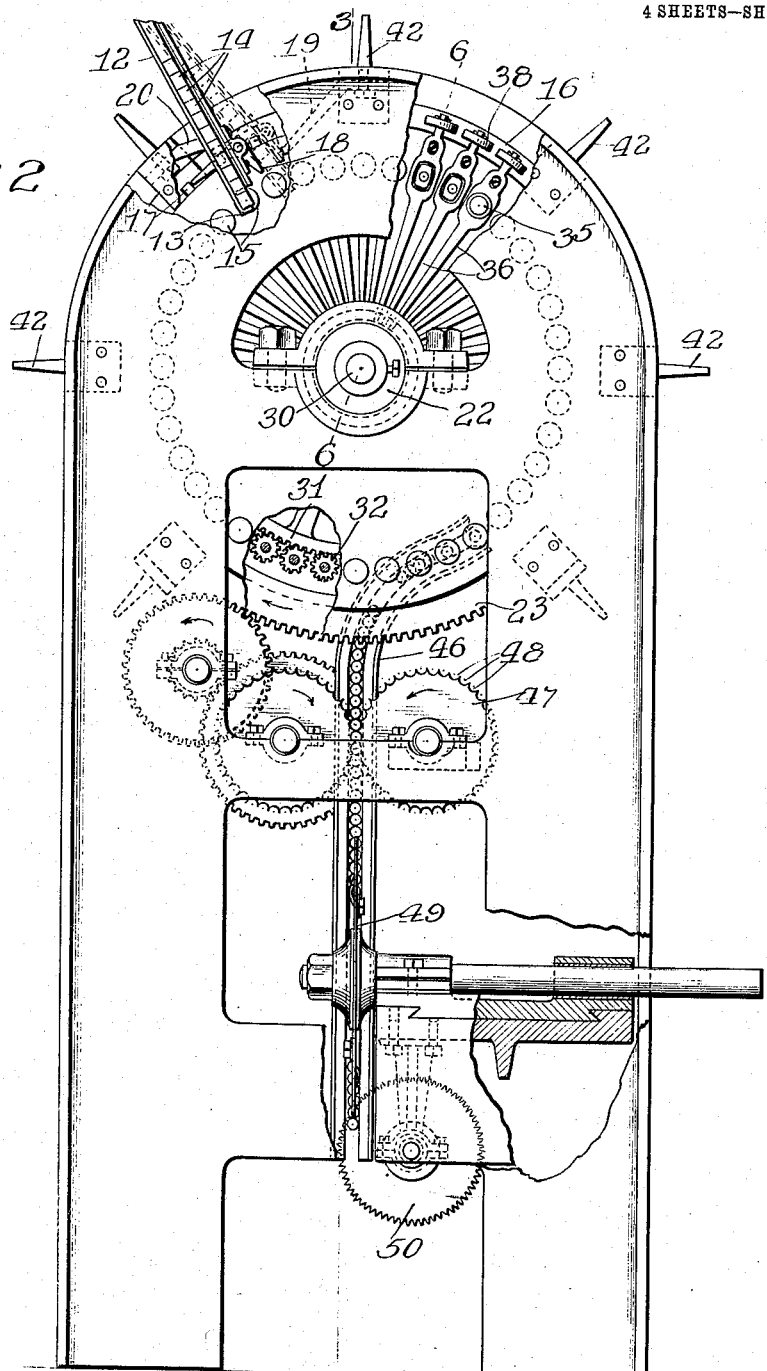
Figure 3:
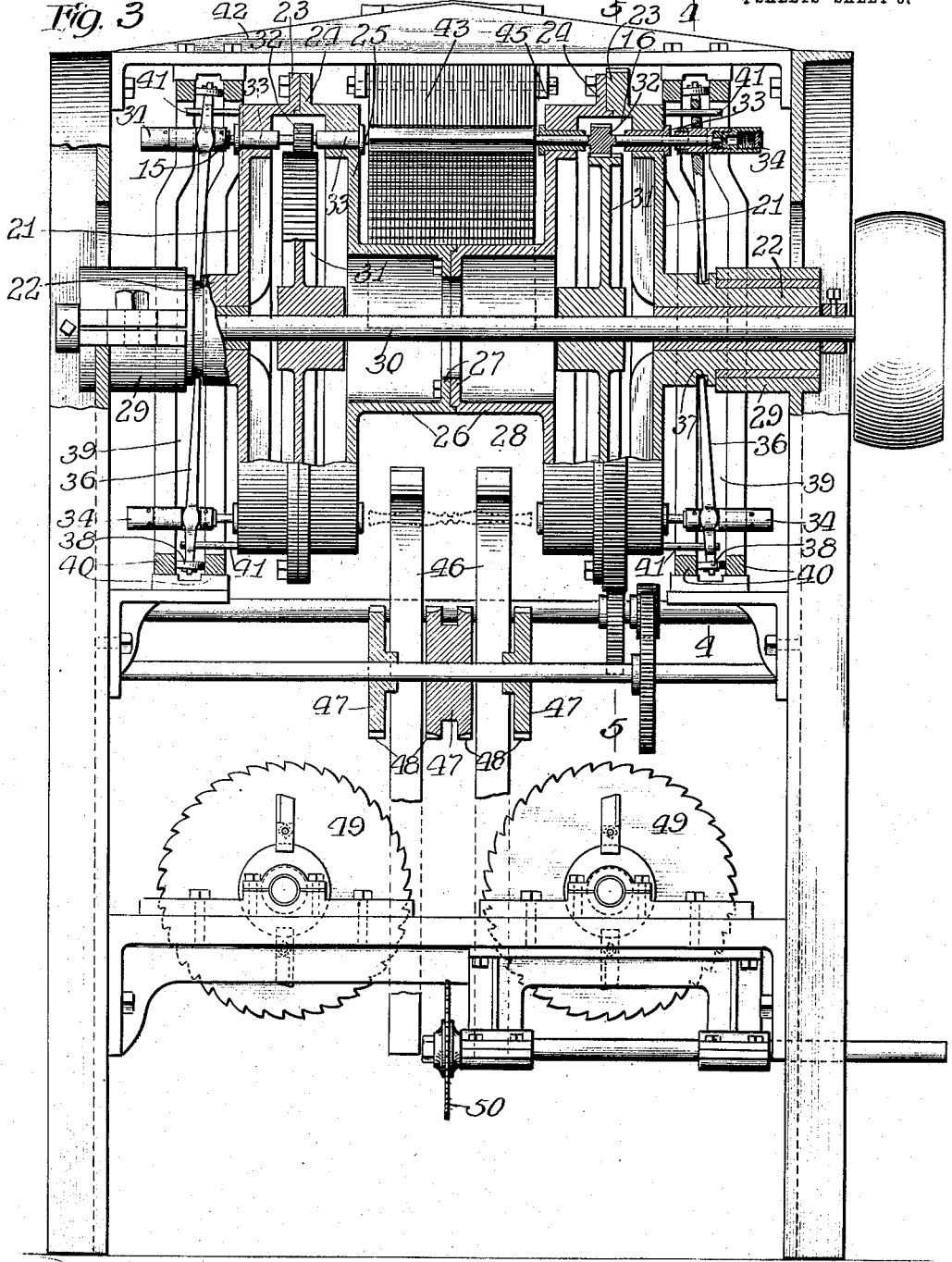
Figure 4:
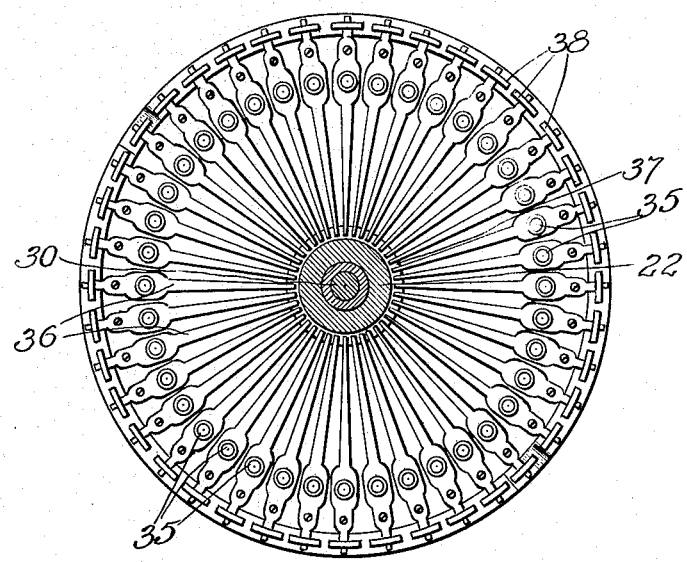
Figure 5:
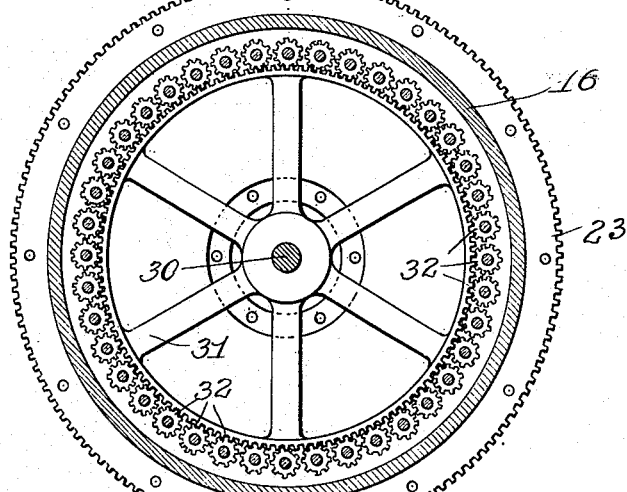

A. SMITH.
MACHINE FOR MAKING CLOTHES PINS.
APPLICATION FILED MAY 4, 1908.

918,708.

Patented Apr. 20, 1909.
4 SHEETS—SHEET 1.

A. SMITH.
MACHINE FOR MAKING CLOTHES PINS.
APPLICATION FILED MAY 4, 1908.

918,708.

Patented Apr. 20, 1909.
4 SHEETS—SHEET 4.

UNITED STATES PATENT OFFICE.

ANDREW SMITH, OF TRAVERSE CITY, MICHIGAN.

MACHINE FOR MAKING CLOTHES-PINS.

No. 918,708. Specification of Letters Patent. Patented April 20, 1909.

Application filed May 4, 1908. Serial No. 430,846.

*To all whom it may concern:*

Be it known that I, ANDREW SMITH, citizen of the United States, residing at Traverse City, in the county of Grand Traverse and State of Michigan, have invented certain new and useful Improvements in Machines for Making Clothes-Pins; and I do hereby declare the following to be a full, clear, and exact description of the invention, such as will enable others skilled in the art to which it appertains to make and use the same.

This invention relates to a novel construction in a machine for making clothes-pins, the object being to provide a practically automatic machine in which the various operations are successively performed so that after feeding blanks thereto said pins are at no time again handled until finished and delivered.

The machine consists in the features of construction and combinations of parts hereinafter fully described and claimed.

In the accompanying drawings illustrating my invention: Figure —1— is a central vertical longitudinal section showing the feeder employed to receive blanks and feed the same to the automatic lathe employed. Fig. —2— is a side elevation showing the automatic lathe, slotter and cutter forming parts of the machine, certain parts being broken away to show the operating mechanism. Fig. —3— is a vertical section on the line 3—3 of Fig. —2—. Fig. —4— is a detail vertical section on the line 4—4 of Fig. —3— showing the devices employed for imparting longitudinal movement to the lathe spindles. Fig. —5— is a section on the line 5—5 of Fig. —3— showing the gearing between the drive shaft and the spindles. Fig. —6— is a fragmentary detail section on the line 6—6 of Fig. —2—. Fig. —7— is a detail view of a cutter employed. Fig. —8— is a detail view in elevation of the inner ends of the lathe spindles.

My invention has for its primary object to provide a simple automatic machine adapted to receive rectangular sticks and deliver finished round clothes-pins without intermediate handling whereby a great economy of labor is effected.

The invention consists in the mechanism employed for carrying out the various operations successively including the means employed for automatically transferring the blanks from one part of the machine to another without handling the same, as will be more fully pointed out in the appended claims.

The machine comprises a feeder receiving the rectangular blanks, a device for adjusting the positions of the blanks, a chute receiving the blanks and successively feeding the same to the lathe, the lathe having automatically actuated spindles engaging the blanks and carrying the same past the cutter, a chute receiving the turned blanks, feeders interposed in the chute and forcing the same past the slotting saws projecting into the path of the blanks, and a saw finally dividing the blanks preparatory to delivery from the machine.

The feeder consists of a belt —1— trained over pulley —2— and over an adjustable idler —3— for taking up slack therein, said belt traveling over the bottom of a trough —4— the side walls of which confine the blanks against endwise movement. The said trough —4— communicates at its delivery end with a chute —5— the inlet end of which is horizontally disposed and the delivery end of which is downwardly inclined, said belt —1— constituting the bottom of the horizontal and elbow portions thereof.

At the inlet end of the chute —5— I provide means for retarding and adjusting the position of the blanks before being carried into said chute said means comprising an oscillating reciprocating arm —6— pivotally secured at one end to the free end of a pivoted link —7— and connected between its ends with the crank —8— on a driven shaft, the free end of said arm —6— being equipped at its free end with horizontally disposed pointed blades —9— which when at the forward limit of their movement project through the slots —10— in the stop plate —11— disposed at the delivery end of the trough —4— and serve to engage and thrust back all blanks piled higher than a single layer thereof thereby preventing choking of the chute and also insuring the disposition of blanks transversely to the direction of movement of the belt —1—.

Pivotally secured to the delivery end of the chute —5— is a chute —12— at the free end of which is a stop —13— upon which the blanks are successively supported, the latter being withdrawn therefrom through the slot —14— in the upper side wall thereof. The delivery end of said chute —12— is disposed in the plane of travel of the lathe spindles —15— carried by the rotating drum —16—, said delivery end being so disposed as to center the blanks successively with relation to the said spindles. The said chute —12— is adapted to oscillate through an arc equal to that separating two adjacent lathe spindles and is actuated by the said drum —16—, the latter being equipped with peripheral projections —17— corresponding in number and relative location with said spindles —15— and which successively engage the trip lever —18— pivotally mounted on the chute —5—. Said trip lever is a bell crank lever pivoted at its elbow, one end thereof being normally disposed in the path of said projections —17— and the other end or arm thereof being adapted to strike a projection —19— on the frame of the machine disposed in the path thereof and serving to turn the same on its pivot until the first named end passes out of engagement with projections —17— whereupon said chute drops back to its normal position which is determined by a stop —20— suitably disposed on the frame of the machine. Each blank is double the length of a clothes pin so that two pins are cut from each, said blanks being engaged at both ends by the usual chisel point projections with which lathe spindles are usually equipped at their ends and the spindles of each pair are disposed in axial alinement and both driven, and also simultaneously move longitudinally, the longitudinal movement being transmitted thereto by means of cam actuated levers which will be hereinafter fully described. The said drum —16— consists of end plates —21— having centrally disposed trunnions —22—, and L-shaped peripheral flanges —23—. Opposed to the latter are similarly shaped flanges —24— of intermediate plates —25— provided with central cylindrical projections —26— equipped at their free ends with inwardly extending annular flanges —27— which meet midway between the ends of the drum and are bolted together. The middle portion of said drum is thus considerably smaller in diameter than the end portions thereof thus providing an annular recess —28— between the said end portions into which the ends of the spindles —15— project to support and rotate the blanks. Said drum is sealed at and between its ends, the flange —23— of one end plate —21— being peripherally equipped with teeth to constitute the same a spur gear by means of which the drum is rotated. The trunnions —22— are journaled in bearings —29— in the side plates of the frame of the machine and are hollow, a shaft —30— being journaled therein which passes centrally through said drum and carries spur gears —31— which rotate in the larger end portions of the latter. The said spur gears —31— mesh with spur pinions —32— rigid with the said spindles —15—, said pinions having faces of less width than said spur gears to permit lateral movement thereof relatively to the latter. The said spindles —15— are journaled in bushings —33— disposed in the end plates —21— and intermediate plates —25— of the drum, the outer ends of said spindles being journaled in thrust bearings —34— with relation to which they are longitudinally immovable. Said thrust bearings —34— pass through slots —35— between the ends of radially disposed levers —36— and are suitably secured therein. The said levers —36— project loosely into annular grooves —37— in the trunnions —22— of the drum and at their outer ends are equipped with anti-friction rollers —38— traveling in a groove —39— of a cam —40— suitably mounted on the frame of the machine and serving to oscillate said levers at certain points in their travel. Said levers —36— are further provided adjacent their outer ends with openings through which pins —41— projecting horizontally from the end plates of the drum pass, said pins coacting with the spindles to maintain said levers radially disposed. The said cam —40— so guides said rollers —38— as to thrust the spindles —15— inwardly at the same time that the chute —12— moves forward to center a blank with relation thereto, the central conical projections of the spindles being very much longer than the chisel projections thereof so that the blank is supported on said central projections after being withdrawn from the chute —12— before the said chisel projections engage the same. The blank is thus free to rotate before said chisel projections engage the same and such rotation is begun the moment that the said chute —12— drops back to its normal position. The said plates of the frame of the machine are connected together by means of cross bars —42— secured thereto, and on said cross bars the cutter —43— is supported. The latter consists preferably of segmental toothed plates which are mounted side by side and may be relatively so positioned as to laterally conform in shape with the periphery of the finished blank, said cutter being the equivalent substantially of a milling tool or saw and the teeth thereof constituting successive knives each of which cuts a little deeper into the blank than the next preceding, the last tooth or lateral row of teeth finishing the blank.

The cutter in its assembled form is equipped in its rear wall with parallel recesses —44— through which bolts —45— pass by means of which the plates are secured together and which also serve to engage suitable supporting devices. The said cutter is so disposed relatively to the cam —40— as to begin cutting the blanks only after the latter are fully engaged by the spindles —15— and finishing the cutting or turning of the blanks during the travel of the drum through an arc of substantially ninety degrees.

Projecting into the recess —28— of the drum —16— and into the path of the turned blanks are the segmental arms of guides —46— between which said blanks are received and which constitute substantially a vertical chute therefor. The cam —40— is so formed as to release the blanks after the latter pass between the said segmental arms, and said blanks then pass into engagement with rotating disks —47— provided with peripheral recesses —48— conforming in shape and size with said blanks, the latter being confined in the opposed recesses of the opposed disks —47— and are forced downwardly through the lower part of the chute thereby and past the slotting saws —49— which project into the path of said blanks and bifurcate the ends thereof. The lowermost end of the chute formed by the guides —46— is contracted in any suitable manner so as to resist the passage of the said pins, the latter thus becoming stacked in said chute in close contact with each other. The said saws —49— rotate in a direction to resist the downward passage of the blanks, the latter being thus forced past said saws by the action of said disks —47—. The said saws —49— are disposed on adjustable supports so that the same may be withdrawn from operative position to permit filling of the chute before beginning the slotting operation and may be adjusted to slot the pins to any desired depth. A circular saw —50— projects into the path of the pins adjacent the delivery end of the chute and serves to cut the blanks midway between their ends to form two finished pins each.

It is essential to the operation of the machine that the disks —47— be so geared relatively to the drum —16— as to rotate through an arc separating two adjacent recesses —46— therein during the same interval that said drum —16— rotates through an arc equal to the distance between two adjacent spindles —15—, this being accomplished in any suitable manner. The shaft —30— and the saws —49— and —50— respectively are preferably driven at high speed and independently of each other and of the said drum —16—.

I claim as my invention:

1. In a machine of the kind specified, the combination with a traveling member equipped with rotating spindles disposed equidistantly from the center thereof and movable in a direction parallel with the axis thereof to engage and release blanks to be turned, of an automatic feed chute delivering blanks to said spindle and movable at its delivery end, a trip lever on said chute, projections on said rotating member engaging said trip lever to move said delivery end, and a releasing projection operatively disposed in the path of said trip lever.

2. In a machine of the kind specified, a rotating hollow drum provided between its ends with an annular depression, a plurality of opposed spindles journaled in bearings in the end plates of said drum and side walls of said depression and projecting at their inner ends into the latter, a shaft passing centrally through said drum, spur gears carried thereby, spur pinions on said spindles meshing with said gears, said drum constituting a gear case and oil chamber, means imparting longitudinal movement to said spindles at intervals in their travel, and automatic blank feeding means operatively disposed relatively to said spindles.

3. In a machine of the kind specified, a rotating hollow drum provided between its ends with an annular depression, a plurality of opposed spindles journaled in bearings in the end plates of said drum and side walls of said depression and projecting at their inner ends into the latter, a shaft passing centrally through said drum, spur gears carried thereby, spur pinions on said spindles meshing with said gears, said drum constituting a gear case and oil chamber, means imparting longitudinal movement to said spindles at intervals in their travel, projections on said drum, a feed chute having its delivery end disposed in alinement with the travel of said spindles, a trip lever carried thereby, and normally disposed in the path of said projections to impart movement to said chute, and a stop disposed in the path of and adapted to engage and trip said trip lever to release said chute.

4. In a machine of the kind specified, a rotating hollow drum provided between its ends with an annular depression, a plurality of opposed spindles journaled in bearings in the end plates of said drum and side walls of said depression and projecting at their ends into the latter, a shaft passing centrally through said drum, spur gears carried thereby, spur pinions on said spindles meshing with said gears, said drum constituting a gear case and oil chamber, means imparting longitudinal movement to said spindles at intervals in their travel, projections on said drum, a feed chute having its delivery end disposed in alinement with the travel of said spindles, a trip lever carried thereby, and normally disposed in the path of said projections to impart movement to said chute, and a stop disposed in the path of and adapted to engage and trip said trip lever to release said chute, said chute being moved in the interval of inward thrust movement of said spindles to engage and withdraw a blank from said chute.

5. In a machine of the kind specified, the combination with a rotating drum equipped with a plurality of rotating spindles, and means operatively disposed with relation to said spindles to impart thrust movement thereto at intervals, and projections on said drum corresponding in number and relative location with said spindles, of a blank feeding chute having a movable delivery end, a trip lever thereon disposed in the path of and adapted to be successively engaged by the projections of said drum to throw said chute into position relatively to said spindles to bring a blank into engaging relation to the latter at the intervals of thrust movement thereof, and a projection on the frame of the machine in the path of and engaging said trip lever to throw the latter out of engagement with said projections.

6. In a machine of the kind specified, a traveling carrier for blanks, a chute communicating with the delivery end thereof, means preventing choking of the mouth of said chute, the delivery end portion of said chute being movable and equipped with a stop at its lower end, there being a lateral slot adjacent said stop, a trip lever on said delivery end portion of said chute, a traveling member equipped with rotating spindles, projections on said member engaging said trip lever to move said delivery end of said chute to bring blanks successively into proper alinement with spindles, a stop disposed on the frame of the machine in the path of said trip lever and actuating same to release it from engagement with a projection of said member, and means imparting thrust movement to said spindles simultaneously with the movement of the delivery end of said chute to engage said blank In testimony whereof I have signed my name in the presence of two subscribing witnesses.

ANDREW SMITH.

Witnesses:
 RUTH RUMSEY,
 W. C. HULL.